United States Patent
Shyr

(10) Patent No.: US 7,285,722 B2
(45) Date of Patent: Oct. 23, 2007

(54) MOUNTING BRACKET

(75) Inventor: Punch Shyr, Taipei (TW)

(73) Assignee: P-Sun International Co., Ltd., Taipei (TW)

( * ) Notice: Subject to any disclaimer, the term of this patent is extended or adjusted under 35 U.S.C. 154(b) by 0 days.

(21) Appl. No.: 11/368,528

(22) Filed: Mar. 7, 2006

(65) Prior Publication Data

US 2007/0209819 A1    Sep. 13, 2007

(51) Int. Cl.
*H01H 9/02*    (2006.01)

(52) U.S. Cl. ............................ 174/58; 174/50; 174/53; 174/481; 220/3.2; 220/3.3; 248/906

(58) Field of Classification Search .................. 174/48, 174/50, 53, 57, 58, 135, 480, 481; 220/3.2, 220/3.3, 3.4, 3.5, 3.7, 3.8, 3.9, 4.02; 248/906, 248/200, 216.4, 222.14, 314, 309.1; 206/480, 206/231; 24/455
See application file for complete search history.

(56) References Cited

U.S. PATENT DOCUMENTS

| | | | | |
|---|---|---|---|---|
| 1,718,878 A * | 6/1929 | Raquette | ..................... | 248/906 |
| 3,822,783 A * | 7/1974 | Mortensen | ................... | 206/480 |
| 3,834,658 A * | 9/1974 | Theodorides | ............... | 248/906 |
| 4,447,030 A * | 5/1984 | Nattel | ......................... | 248/906 |
| 5,221,069 A * | 6/1993 | Struthers et al. | ............ | 248/314 |
| 5,253,831 A * | 10/1993 | Theodorides | ............... | 248/906 |
| 5,810,303 A * | 9/1998 | Bourassa et al. | ............. | 174/58 |
| 6,107,568 A * | 8/2000 | Schnell et al. | ................ | 174/61 |
| 6,509,524 B1 * | 1/2003 | Gretz | .......................... | 174/50 |
| 6,677,523 B1 * | 1/2004 | Gretz | .......................... | 174/58 |
| 6,827,229 B2 * | 12/2004 | Dinh et al. | .................. | 220/3.3 |
| 6,956,172 B2 * | 10/2005 | Dinh | ........................... | 174/58 |

\* cited by examiner

*Primary Examiner*—Angel R. Estrada
(74) *Attorney, Agent, or Firm*—Rabin & Berdo, P.C.

(57) ABSTRACT

The present invention relates to a mounting bracket having a plurality of apertures on both sides of a main body of the mounting bracket and a turning surface disposed at an angle of 90 degrees from a rear end of the main body. The invention is characterized in that the main body includes a positioning member at a predetermined position of the main body for temporarily fixing a nail or a screw, and the positioning member includes an accommodating space therein for receiving the nail or a screw and fixing the nail or a screw onto the main body.

6 Claims, 4 Drawing Sheets

MOUNTING BRACKET

BACKGROUND OF THE INVENTION

1. Field of the Invention

The present invention relates to a mounting bracket, and more particularly to a mounting bracket used in a hose and the outlet box of washing machine that is built between wooden or metal studs which holds the box in the wall.

2. Description of the Related Art

As needed in our daily life, certain water pipes or other drain pipes are buried into a wall surface of a wooden construction to go with various different cleansing appliances such as wash basins, taps, and washers, etc. and an outboard box is usually installed in a drain pipe inside a wall surface for connecting the drain pipe and a water control bolt. Mounting brackets are inserted from an upper end into slots disposed on both sides of the outboard box, and a nail or a screw is used to fix each mounting bracket onto a wood or metal stud. In general, the mounting bracket and the nail or screw are packaged separately, and thus making the material packaging as well as the installation and construction at a later stage more complicated and inconvenient. Therefore, finding a way to improve the convenient use of the mounting bracket and nail is the subject of the present invention.

SUMMARY OF THE INVENTION

It is a primary objective of the present invention to provide a way of temporarily fixing a screw or a nail onto a mounting bracket, not only saves the additional packaging of the nail, but also provides an easy way for removing the nail directly from the mounting bracket and facilitating a construction work. The nail attached allows the plumber easier installation. The users does not need to obtain nail/screws from another package.

To provide convenience to users, the present invention designs a positioning member disposed at a predetermined position of the main body for temporarily fixing a nail or a screw, between studs of building before wall board or sheet rock is installed to finish the wall. And the positioning member has an accommodating space therein for receiving the nail or a screw and fixing the nail or a screw onto the main body.

BRIEF DESCRIPTION OF THE DRAWINGS

FIG. 4 is a schematic view of installing a mounting bracket and a nail according to the present invention;

FIG. 5 is a schematic view of combining a mounting bracket and a nail according to the present invention;

FIG. 6 is a schematic view of a mounting bracket according to a second preferred embodiment of the present invention;

FIG. 7 is a schematic view of a mounting bracket according to a third preferred embodiment of the present invention;

DETAILED DESCRIPTION OF THE PREFERRED EMBODIMENTS

The present invention will now be described in more detail hereinafter with reference to the accompanying drawings that show various embodiments of the invention.

Figure 1:
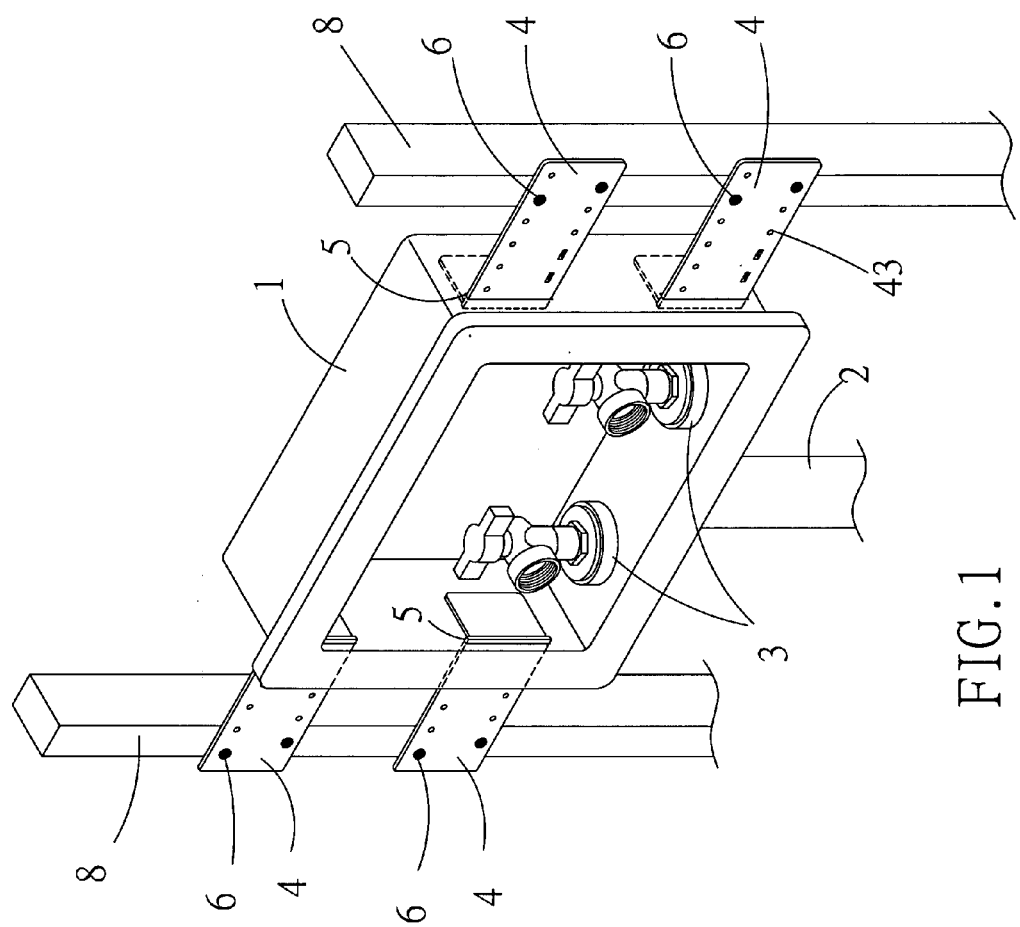
FIG. 1 is a schematic view of a mounting bracket and an outboard box being installed inside a wall surface of a wooden construction.
Figure 2:
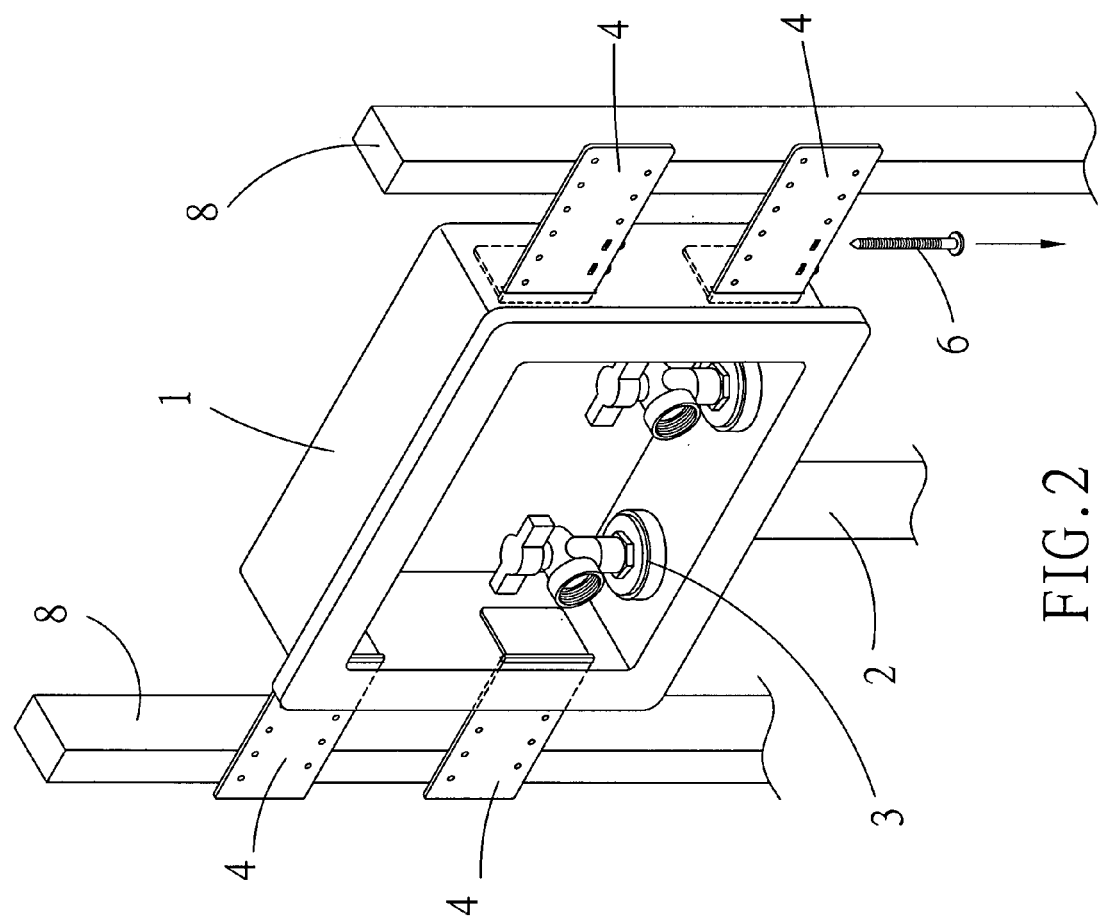
FIG. 2 is a schematic view of removing a nail from a positioning member of a mounting bracket.
Figure 3:
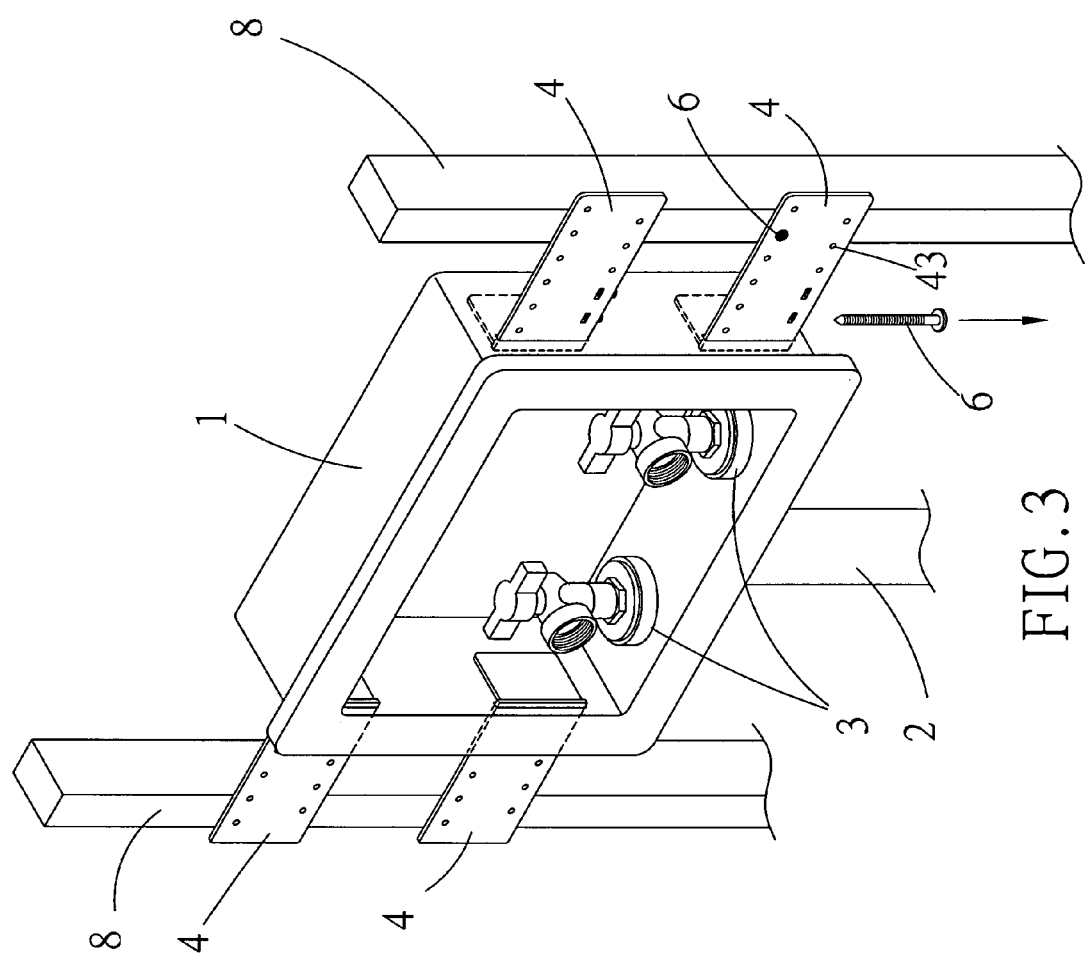
FIG. 3 is a schematic view of securing a nail into a wood stud directly through an aperture on the mounting bracket after the nail is removed from the positioning member according to a preferred embodiment of the present invention.

Refer to FIGS. 1 to 3 for the mounting bracket and outboard box being installed inside the wall surface of a wooden construction.

In a drain pipe installed in a wall surface of a wooden construction, an outboard box 1 is usually installed for connecting a drain pipe 2 and a water valves 3, and a plurality of mounting brackets 4 are inserted into slots disposed on both sides of the outboard box 1 from an upper end, and then the mounting bracket is fixed onto a wood studs 8 inside a wall surface by a nail 6 or screw. The studs of building before wall board or sheet metal is installed to finish the wall.

Referring to FIGS. 4 and 5, the structure of the mounting bracket 4 of the invention includes a plurality of apertures 43 disposed on both sides of a main body 41, and a turning surface 42 disposed at 90 degrees from a rear end of the main body. The key points of the invention reside on that the main body 41 includes a positioning member 44 disposed at a predetermined position for temporarily fixing a nail 6 or a screw, and the positioning member 44 is protruded from the main body 41, so as to form an accommodating space 45 therein for receiving the nail 6 and screw and fixing the nail 6 or screw onto the main body 41. The user does not need to get nails from another package. Such design not only saves the additional packaging of the nail, but also makes it easy for users to remove the nail directly from the mounting bracket conveniently and provides tremendous convenience to users. The positioning member 44 and an accommodating space 45 are located in main body 41, these allow dry wall to lay flat and not to interfere with dry wall installation.

Referring to FIG. 6 for the schematic view of the structure of a mounting bracket according to a second preferred embodiment of the present invention, the mounting bracket 4 includes at least one protruding sheet positioning member 51 disposed on a lateral side of the main body 41, and the positioning member 51 forms a hole 52 for inserting the nail 6 therein, so as to temporarily fix the nail 6 or screw and allow users to remove the nail 6 freely and conveniently. Again this location hold nail without interfering in dry wall by causing a raised area.

Referring to FIG. 7 for the schematic view of the structure of a mounting bracket according to a third preferred embodiment of the present invention, the positioning member 61 of the mounting bracket 4 includes a groove 62 for transversally placing the nail 6 therein, so as to temporarily fix the nail 6 or screw and allow users to remove the nail 6 freely and conveniently. Again this location hold nail without interfering in dry wall by causing a raised area.

Figure 8:
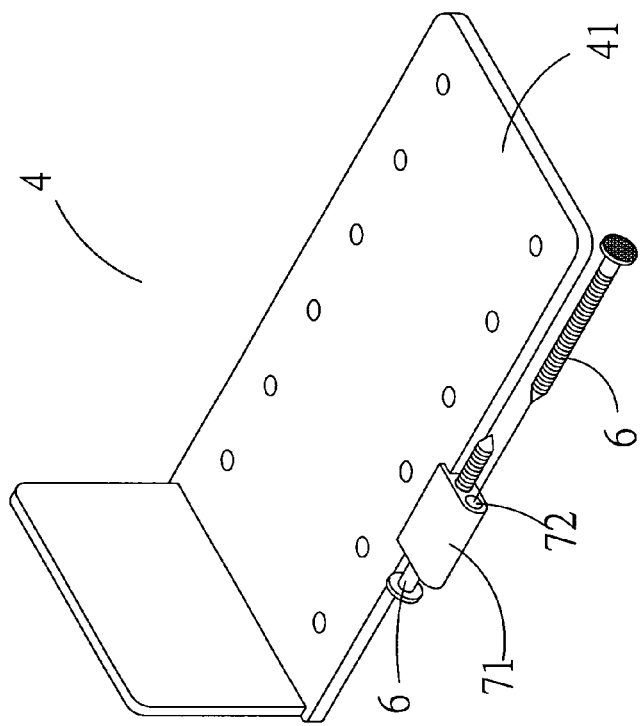
FIG. 8 is a schematic view of a mounting bracket according to a fourth preferred embodiment of the present invention.

Referring to FIG. 8 for the schematic view of the structure of a mounting bracket according to the fourth preferred embodiment of the present invention, the positioning member 71 of the mounting bracket 4 is disposed on a lateral side of the main body 41 and includes a protruding through hole 72, and the through hole 72 provides a space for accommodating the nail 6 and temporarily inserting the nail 6 therein, so as to temporarily fix the nail 6 into the through hole 72 and allow users to remove the nail 6 from the through hole 72 conveniently. Again this location hold nail without interfering in dry wall by causing a raised area.

Figure 9:
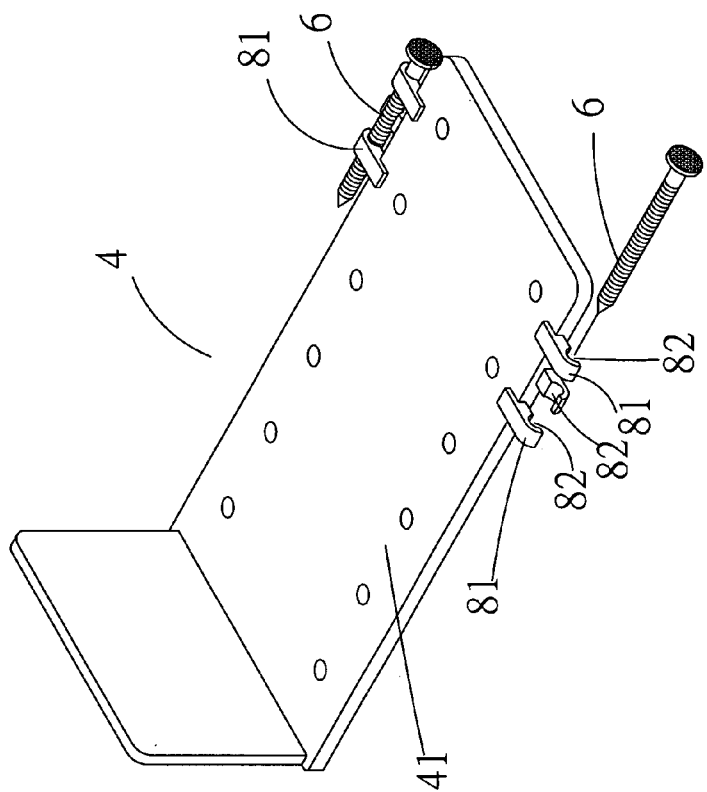
FIG. 9 is a schematic view of a mounting bracket according to a fifth preferred embodiment of the present invention.

Referring to FIG. 9 for the schematic view of the structure of a mounting bracket according to a fifth preferred embodiment of the present invention, the positioning member 81 of the mounting bracket 4 is disposed separately on both sides of the main body 41, and the positioning members 81 are clamping plates vertically engaged with each other and having a concave 82 therein for clamping the inserted nail 6 or screw tightly, so as to temporarily clamp and fix the nail 6 and allow users to remove the nail 6 conveniently. Again this location hold nail without interfering in dry wall by causing a raised area.

The foregoing preferred embodiments can achieve the effects of saving the additional packaging of the nail as well as making it easy for users to remove the nail directly from the mounting bracket to facilitate constructions, and thus providing tremendous convenience to users.

What is claimed is:

1. A mounting bracket, having
a main body,
a turning surface forming an angle of 90 degrees with a rear end of said main body of said mounting bracket, and
a plurality of apertures disposed on said main body,
wherein said main body includes a positioning member disposed at a predetermined position of said main body for temporarily fixing a nail or screw,
said positioning member includes an accommodating space therein for accommodating said nail or said screw and fixing said nail or said screw onto said main body,
said positioning member further comprises a protruding sheet positioning member disposed on a lateral side of said main body, said positioning member forming a hole thereon,
said positioning member of said mounting bracket is disposed separately on both lateral sides of said main body, and
said positioning members are clamping plates vertically engaged with each other and having a concave indentation therein for inserting said nail or clamping said screw.

2. The mounting bracket of claim 1, wherein said positioning member of said mounting bracket includes a groove for transversally receiving said nail or said screw.

3. The mounting bracket of claim 1, wherein said positioning member is located on said mounting bracket so as not to interfere with the dry wall or cause a raised surface.

4. A mounting bracket, having
a main body,
a turning surface forming an angle of 90 degrees with a rear end of said main body of said mounting bracket, and
a plurality of apertures disposed on said main body,
wherein said main body includes a positioning member disposed at a predetermined position of said main body for temporarily fixing a nail or screw,
said positioning member includes an accommodating space therein for accommodating said nail or said screw and fixing said nail or said screw onto said main body, and
said positioning member of said mounting bracket disposed on a lateral side of said main body includes a through hole protruded from a lateral side of said positioning member for providing a space to accommodate said nail or said screw, and said through hole is provided for inserting said nail or said screw,
said positioning member of said mounting bracket is disposed separately on both lateral sides of said main body, and
said positioning members are clamping plates vertically engaged with each other and having a concave indentation therein for inserting said nail or clamping said screw.

5. The mounting bracket of claim 4, wherein said positioning member of said mounting bracket includes a groove for transversally receiving said nail or said screw.

6. The mounting bracket of claim 4, wherein said positioning member is located on said mounting bracket so as not to interfere with the dry wall or cause a raised surface.

* * * * *